(12) United States Patent
Chang et al.

(10) Patent No.: US 9,852,005 B2
(45) Date of Patent: Dec. 26, 2017

(54) MULTI-CORE PROCESSOR SYSTEMS AND METHODS FOR ASSIGNING TASKS IN A MULTI-CORE PROCESSOR SYSTEM

(71) Applicant: MediaTek Inc., Hsin-Chu (TW)

(72) Inventors: Ya-Ting Chang, Hsinchu (TW); Yu-Ting Chen, Taipei (TW); Yu-Ming Lin, Taipei (TW); Jia-Ming Chen, Zhubei (TW); Hung-Lin Chou, Zhubei (TW); Tzu-Jen Lo, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/799,921

(22) Filed: Jul. 15, 2015

(65) Prior Publication Data
US 2016/0098300 A1    Apr. 7, 2016

Related U.S. Application Data

(60) Provisional application No. 62/058,846, filed on Oct. 2, 2014.

(51) Int. Cl.
G06F 9/48    (2006.01)

(52) U.S. Cl.
CPC ...... *G06F 9/4881* (2013.01); *G06F 2209/483* (2013.01)

(58) Field of Classification Search
CPC .................................................. G06F 9/5038
See application file for complete search history.

(56) References Cited

U.S. PATENT DOCUMENTS

| | | | |
|---|---|---|---|
| 2011/0088041 A1* | 4/2011 | Alameldeen | G06F 9/505 718/105 |
| 2013/0042250 A1* | 2/2013 | Lim | G06F 9/4881 718/103 |
| 2013/0151814 A1* | 6/2013 | Ueda | G06F 9/5083 712/30 |
| 2013/0198758 A1* | 8/2013 | Lim | G06F 9/5038 718/104 |
| 2013/0247068 A1* | 9/2013 | Min | G06F 9/5088 718/105 |
| 2014/0052882 A1* | 2/2014 | Waters | G06F 9/4843 710/267 |
| 2014/0181825 A1* | 6/2014 | He | G06F 9/5027 718/102 |

\* cited by examiner

*Primary Examiner* — Charlie Sun
(74) *Attorney, Agent, or Firm* — McClure, Qualey & Rodack, LLP

(57) ABSTRACT

A multi-core processor system and a method for assigning tasks are provided. The multi-core processor system includes a plurality of processor cores, configured to perform a plurality of tasks, and each of the tasks is in a respective one of a plurality of scheduling classes. The multi-core processor system further includes a task scheduler, configured to obtain first task assignment information about tasks in a first scheduling class assigned to the processor cores, obtain second task assignment information about tasks in one or more other scheduling classes assigned to the processor cores, and refer to the first task assignment information and the second task assignment information to assign a runnable task in the first scheduling class to one of the processor cores.

20 Claims, 5 Drawing Sheets

MULTI-CORE PROCESSOR SYSTEMS AND METHODS FOR ASSIGNING TASKS IN A MULTI-CORE PROCESSOR SYSTEM

CROSS REFERENCE TO RELATED APPLICATIONS

This application claims priority of U.S. Provisional Patent Application No. 62/058,846, filed on Oct. 2, 2014, the entirety of which is incorporated by reference herein.

BACKGROUND OF THE INVENTION

Field of the Invention

The invention generally relates to task assignment in a multi-core processor system, and more particularly, to task assignment that cross refers to task assignment information corresponding to multiple scheduling classes at the same time.

Description of the Related Art

In electronic devices such as smartphones, notebooks, and tablet computers, a task scheduler is configured to schedule or assign tasks a multi-core processor system including a plurality of processor cores. The tasks can be scheduled according to different scheduling algorithms, which for example, can include RT (real-time) scheduler, and/or a Completely Fair Scheduler (CFS), and/or any specific scheduling algorithm. Tasks can be referred to according to their corresponding scheduling algorithms. For example, tasks scheduled according to RT scheduler can be referred to as RT tasks, and tasks scheduled according to CFS can be referred to as CFS tasks.

When the task scheduler assigns tasks to the processor cores, it refers to task assignment information about tasks currently assigned to the processor cores. In addition, the task scheduler assigns RT tasks and CFS tasks independently. Specifically, when the task scheduler assigns a RT task, it refers to only task assignment information about RT tasks currently assigned to the processor cores, without considering CFS tasks or any other tasks different from RT tasks currently assigned to the processor cores. Similarly, when the task scheduler assigns a CFS task, it does not refer to task assignment information about tasks other than CFS tasks assigned to the processor cores. In summary, when the task scheduler assigns a task scheduled by a specific scheduling algorithm, it does not consider tasks scheduled by any other scheduling algorithms different from the specific scheduling algorithm.

However, load imbalance often occurs and the performance of the processor cores is not optimal. Solving the problems to improve task assignment and system performance in a multi-core processor system is therefore a subject worthy of discussion.

BRIEF SUMMARY OF THE INVENTION

Multi-core processor system and method for assigning tasks are provided to overcome the problems mentioned above.

An embodiment of the invention provides a method for assigning tasks in a multi-core processor system, wherein the multi-core processor system comprises a plurality of processor cores, and each of the tasks is in a respective one of a plurality of scheduling classes. The method comprises obtaining first task assignment information about tasks in a first scheduling class assigned to the processor cores, obtaining second task assignment information about tasks in one or more other scheduling classes assigned to the processor cores, wherein each of the one or more other scheduling classes is different from the first scheduling class, and referring to the first task assignment information and the second task assignment information to assign a runnable task in the first scheduling class to one of the processor cores.

The plurality of scheduling classes may correspond to a plurality of scheduling algorithms, respectively. Each of tasks can be scheduled according to one of the scheduling algorithms corresponding to the scheduling class of the task, respectively. The plurality of scheduling classes can be associated with a plurality of priority ranges, respectively, and each of the tasks can have a respective task priority in one of the priority ranges associated with the scheduling class of the task.

In some embodiments, prior to the assigning the runnable task, the runnable task has not been assigned to any of the processor cores. In other embodiments, prior to the assigning the runnable task in the first scheduling class to the one of the processor cores, the runnable task in the first scheduling class has been assigned to one of the processor cores.

Another embodiment of the invention provides a multi-core processor system, comprising: a plurality of processor cores, configured to perform a plurality of tasks, wherein each of the tasks is in a respective one of a plurality of scheduling classes, and a task scheduler, configured to obtain first task assignment information about tasks in a first scheduling class assigned to the processor cores, obtain second task assignment information about tasks in one or more other scheduling classes assigned to the processor cores, wherein each of the one or more other scheduling classes is different from the first scheduling class, and refer to the first task assignment information and the second task assignment information to assign a runnable task in the first scheduling class to one of the processor cores.

Compared to the conventional method that considers insufficient task assignment information in assign tasks, the embodiments refer to more task assignment information. That is, to assign a runnable task, information about tasks in other one or more scheduling classes different from the scheduling class of the runnable task can be taken into consideration. Due to considering more task assignment information, load can be more balanced on the processor cores, and the performance of the multi-core processor system can be improved.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It should be noted that the term "multi-core processor system" may mean a multi-core system or a multi-processor system, depending upon the actual design. In other words, the proposed task scheduling method may be employed by any of the multi-core system and the multi-processor system. For example, concerning the multi-core system, all of the processor cores may be disposed in one processor core. For another example, concerning the multi-processor system, each of the processor cores may be disposed in one processor core. Hence, each of the clusters may be implemented as a group of processors.

Figure 1:
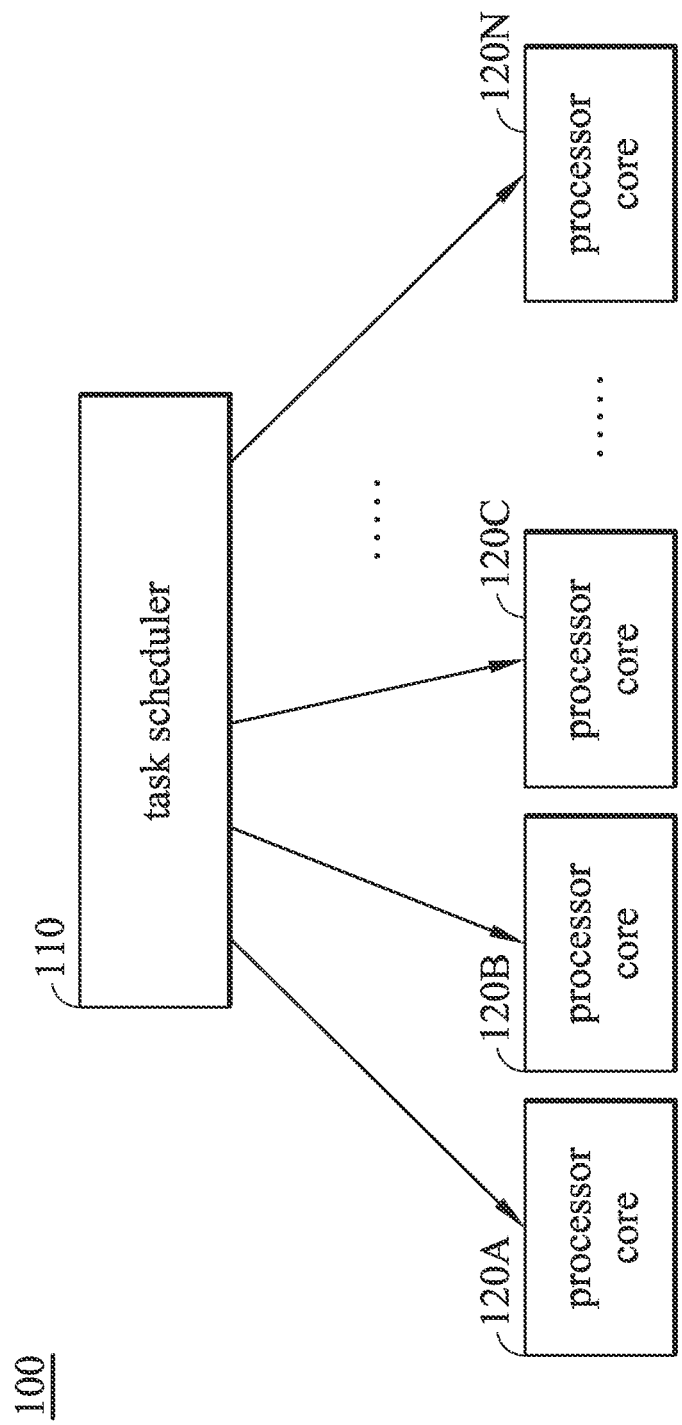
FIG. 1 is a block diagram of a multi-core processor system 100 according to an embodiment of the invention.

FIG. 1 is a block diagram of a multi-core processor system 100 according to an embodiment of the invention. The multi-core processor system 100 comprises a task scheduler 110, and a plurality of processor cores 120A-120N. FIG. 1 presents a simplified block diagram in which only the elements relevant to the invention are shown. However, the invention should not be limited to what is shown in FIG. 1.

The processor cores 120A-120N are configured to perform or execute the tasks and instructions, wherein the processor cores 120A-120N may be Central Processing Units (CPUs), or other processing elements. The multi-core processor system 100 may be a Symmetric multi-processing (SMP) type, or a Heterogeneous Multi-Processing (HMP) type, or any other type of multi-core processor system. The task scheduler 110 may be implemented in a kernel of an operation system (i.e. Linux, Windows, Mac OS X, Linux, etc.) of the multi-core processor system 100. The task scheduler 110 is configured to assign the tasks to the processor cores 120A-120N.

Figure 2:
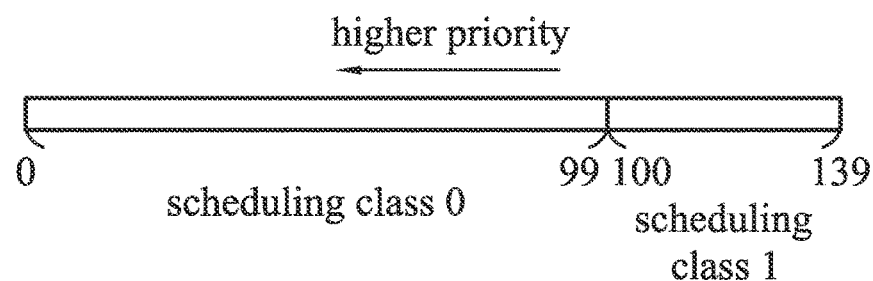
FIG. 2 is a schematic diagram illustrating priority ranges according to an embodiment of the invention.

FIG. 2 is a schematic diagram illustrating priority ranges according to an embodiment of the invention. As shown, there are a plurality of scheduling classes, which are associated with a plurality of priority ranges, respectively. For example, a scheduling class 0 covering a first priority range (e.g., 0-99) and another scheduling class 1 covering a second priority range (e.g., 100-139). Tasks assigned by the task scheduler 110 can be defined to be in any of the scheduling classes. In addition, each task can be given a respective task priority, which is in the priority range associated with the scheduling class of the task. For example, a task given a task priority 50 is in the scheduling class 0, and a task given a task priority 110 is in the scheduling class 1. Therefore, tasks in class 0 can have task priorities ranging from 0-99, and tasks in class 1 can have task priorities ranging from 100-139. A task with a smaller value of task priority means the task has higher priority to be executed. That is, when there are a task with task priority m and another task with task priority n (m<n) both assigned to a processor core, task with task priority m may be given higher priority to be executed than task with task priority n. Similarly, tasks in scheduling class 0 may be given higher priority to be executed than tasks in the scheduling class 1 on the same processor.

In addition, the different scheduling classes (number=M) can correspond to a plurality of scheduling algorithms (number=N, N<=M), respectively. In other words, a task in a scheduling class can be scheduled according to the scheduling algorithm corresponding to the scheduling class. In different embodiments of the invention, the scheduling algorithms comprise at least one of a real-time (RT) scheduler, a Completely Fair Scheduler (CFS; a Shortest Job First (SJF), a First-In First-Out (FIFO) scheduler, a Brain Fuck Scheduler (BFS), a Stop scheduler class, a Deadline scheduler, and any other scheduling algorithms.

In a non-limiting example illustrated with FIG. 2, the scheduling class 0 can correspond to RT scheduler, and the scheduling class 1 can correspond to CFS. Therefore, tasks scheduled according to RT scheduler, hereafter referred to as RT tasks, are in the scheduling class 0 and can have higher task priorities ranging from 0 to 99. Similarly, tasks scheduled according to CFS, hereafter referred to as CFS tasks, are in the scheduling class 1 and have lower task priorities ranging from 100-139.

In an embodiment of the invention, to assign a runnable task to one of the processor cores 120A-120N, the task scheduler 110 may consider not only tasks in a scheduling class of the runnable task (hereafter referred to as a first scheduling class) that are currently assigned to the processor cores but also tasks in one or more scheduling classes different from the first scheduling class currently assigned to the processor cores 120A-120N.

For brevity, information about tasks in the first scheduling class assigned to the processor cores 120A-120N is referred to as first task assignment information; and information about tasks in the other one or more scheduling classes assigned to the processor cores 120A-120N is referred to as second task assignment information. In other words, to assign the runnable task to one of the processor cores 120A-120N, the task scheduler 110 may consider both the first task assignment information and the second task assignment information.

After obtaining the first task assignment information and the second task assignment information, the task scheduler 110 can know task(s) currently running and/or waiting in a queue to be run by the processor core 120A, task(s) currently running and/or waiting in a queue to be run by the processor core 120B, . . . , and task(s) currently running and/or waiting in a queue to be run by the processor core 120N, wherein the tasks known and considered by the task scheduler 110 are not limited to being in the same scheduling class of the runnable task. With the knowledge of the tasks currently assigned to the processor cores 120A-120N, the task scheduler 110 can therefore assign the runnable task in the first scheduling class to an appropriate one of the processor cores 120A-120N.

The method for assigning tasks in the embodiment is in contrast to the conventional method, which considers only the first task assignment information and neglects the second task assignment information. In other words, compared to conventional methods, the embodiment refers to more complete information by considering assigned tasks in more different scheduling classes. Consequently, the embodiment can have more balanced loading for the processor cores and better performance of the multi-core processor system, as will be demonstrated in the following disclosure.

Please be noted that the cross-referring to task information about tasks in different scheduling classes can be applied to any specific tasks/scheduling classes/scheduling algorithms and any numbers thereof. For example, the tasks to be assigned are not limited to having task priorities or being performed in sequence according to their task priorities. In a non-limiting embodiment, the tasks can be scheduled according to their respective deadlines, which can be implemented in the Deadline scheduler, for example.

Please also be noted that the runnable task may have been or not been assigned to any of the processor cores prior. Specifically, in some embodiments illustrated with FIGS. 3-5, prior to the assigning the runnable task, the runnable task has not been assigned to any of the processor cores. In other embodiments, exemplarily illustrated with FIG. 7, prior to the assigning the runnable task in the first scheduling class to the one of the processor cores, the runnable task in the first scheduling class is currently assigned to one of the processor cores but may be reassigned to another one of the processor cores.

In embodiments where the runnable task in the first scheduling class which is not currently assigned to any of the processor cores 120A-120N, before the task scheduler 110 assigns the runnable task in the first scheduling class to one of the processor cores, the task scheduler 110 may wake up the runnable task, and then determines which one of the processor cores 120A~120N is appropriate to be assigned with the runnable task by referring to the first task assignment information and the second task assignment information.

In embodiments where the runnable task in the first scheduling class has been assigned to one processor cores of the processor cores 120A~120N, the task scheduler 110 can determine to whether to reassign the runnable task in the first scheduling class for better load balance according to the first task assignment information and the second task assignment information. If the determination result is positive, the task scheduler 110 may move the runnable task in the first scheduling class to another processor core of the processor cores 120A-120N according to the first task assignment information and the second task assignment information. One advantage of referring to more task assignment information is to prevent non-discrimination between a processor core not assigned with task(s) in the first scheduling class but assigned with task(s) in other different scheduling class(es) and a processor core not assigned with any tasks in any scheduling classes. More specifically, by referring to the first task assignment information, the task scheduler 110 can know that whether at least one processor core is not assigned with any tasks in the first scheduling class. And by referring to the second task assignment information, the task scheduler 110 can further know that whether the at least one of the other processor cores is not assigned with any task in any scheduling class different from the first scheduling class or not. Accordingly, the task scheduler 110 can know whether at least one processor core is not assigned with any tasks or none of the processor cores is not assigned with any tasks, by referring to both the first task assignment information and second task assignment information. Due to a fuller consideration of assigned tasks in different scheduling classes, the task scheduler 110 can assign tasks in a more balanced way, as will be explained more by following embodiments.

Figure 3:
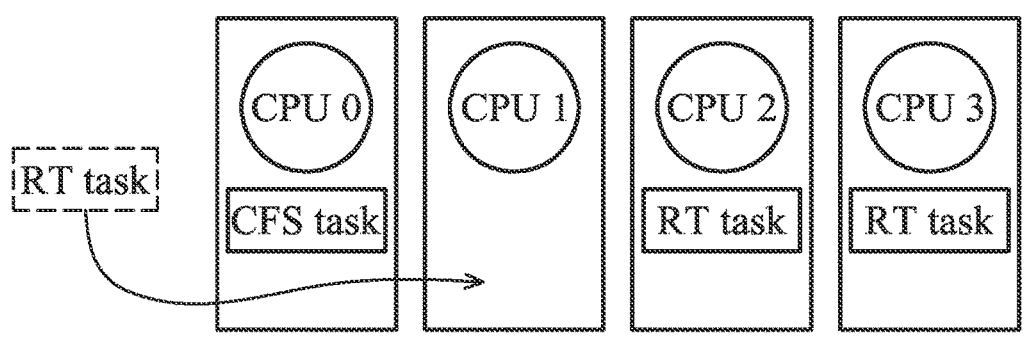
FIG. 3 is a schematic diagram for explaining task assignment in a first case according to an embodiment of the invention.

FIG. 3 is a schematic diagram for explaining task assignment in a first case according to an embodiment of the invention. As exemplarily shown in FIG. 3, there are four processor cores CPU 0-CPU 3 in the multi-core processor system 100. In this case, CPU 0 is assigned with a CFS task, CPU 1 is not assigned with any tasks, and CPU 2 and CPU 3 are assigned with RT tasks, respectively. As mentioned above, a RT task can have higher task priority than a CFS task. When an RT task is awaken and the task scheduler 110 determines to assign the RT task to one of the processor cores, the task scheduler 110 can refers to the task assignment information corresponding to the CFS tasks and RT tasks (i.e. the first task assignment information and the second task assignment information). Knowing that CPU 1 is not assigned with any tasks, the task scheduler 110 can assign the RT task to the processor CPU 1.

In comparison to conventional technology, a conventional task scheduler may refer to the first task assignment information about RT tasks without referring to the second task assignment information about the CFS tasks, and the conventional task scheduler sees CPU 0 and CPU 1 equally. Consequently, the conventional task scheduler may assign the RT task to CPU 0 rather than to CPU 1. In other words, the conventional task scheduler treats the idle CPU 1 and the non-idle CPU 0 indifferently, and it may therefore arrange CPU 0 to undertake more tasks while leaving CPU 1 to remain unassigned with any tasks.

Figure 4:
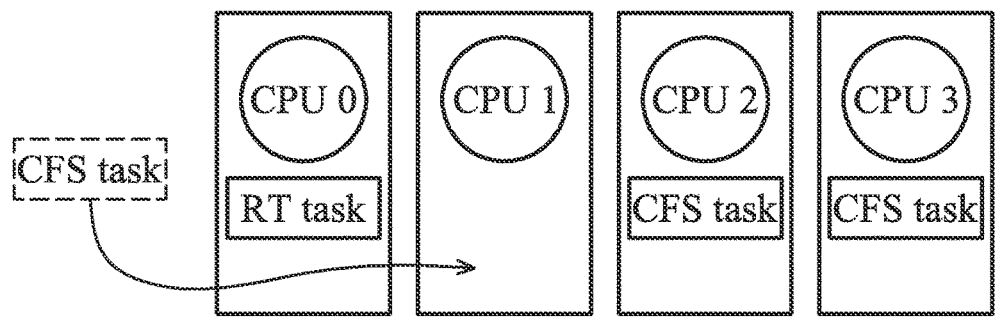
FIG. 4 is a schematic diagram for explaining task assignment in a second case according to another embodiment of the invention.

In comparison, by referring to more complete task assignment information, the task scheduler 110 in the embodiment can discriminate between CPU 1 that is assigned with a CFS task and CPU 1 that is not assigned with any task, and can therefore assign the RT task to CPU 1. The task scheduler 110 in the embodiment can make a more balanced-loading system. FIG. 4 is a schematic diagram for explaining task assignment in a second case according to another embodiment of the invention. FIG. 4 is similar to FIG. 3, differing only in that a RT task is awaked and is to be assigned by the task scheduler 110 to one of the four processor cores CPU 0-CPU 3 in the multi-core processor system 100, where CPU 0 is assigned with a RT task, CPU 1 is not assigned with any tasks, and CPU 2 and CPU 3 are assigned with CFS tasks, respectively.

Similar to the first case in FIG. 3, a conventional task scheduler in the second case may refer to the first task assignment information about CFS tasks without referring to the second task assignment information about the RT tasks, and may therefore assign the CFS task to CPU 0 rather than to CPU 1. In contrast, by referring to not only the first assignment information but also the second assignment information, the task scheduler 110 in the embodiment can discriminate between CPU 0 and CPU 1, and can therefore assign the RT task to CPU 1 that is not assigned with any tasks. Consequently, the task scheduler 110 in the embodiment can make a more balanced-loading system.

In summary, FIGS. 3 and 4 are similar in that at least one processor core is not assigned with any tasks in any scheduling classes. More specifically, when the runnable task (RT task in FIG. 3; CFS task in FIG. 4) in the first scheduling class (scheduling class 0 in FIG. 3; scheduling class 1 in FIG. 4) is wakened up and is to be assigned to one of the processor cores CPU0-CPU3, the first task assignment information and the second task assignment information indicate that at least one CPU1 is not assigned with any tasks in any scheduling class, and the second task assignment information further indicate that one or more of the other processor cores, i.e., CPU 0 is assigned with one or more tasks in one or more different scheduling classes than the first scheduling class (CFS task in FIG. 3; RT task in FIG. 4). In FIG. 3, the at least one of the one or more tasks, i.e., CFS task assigned to CPU 0, has a task priority lower than a task priority of the runnable task (RT task). In contrast, in FIG. 4, the at least one of the one or more tasks, i.e., RT task assigned to CPU 0, has a task priority higher than a task priority of the runnable task (CFS task). In both cases of FIGS. 3 and 4, the runnable task in the first scheduling class can be assigned to one of the at least one processor core not assigned with any tasks, i.e. CPU 1.

It is noted that the advantages of referring more complete task information rest not only in cases where at least one processor core is not assigned with any tasks (e.g., cases in FIGS. 3 and 4) but also in cases where none of the processor cores is not assigned with any tasks. In such cases, due to referring to the second task assignment information, the task scheduler 110 can further consider task priorities of tasks in scheduling classes different from the first scheduling class of the runnable task to be assigned. One of the advantages is to prevent non-discrimination between a processor core not assigned with task(s) in the first scheduling class but assigned with task(s) in other different scheduling class(es) with higher task priorities and a processor core not assigned with task(s) in the first scheduling class but assigned with task(s) in other different scheduling class(es) with lower task priorities. The details will be explained by embodiments illustrated with FIGS. 5 and 6.

Figure 5:
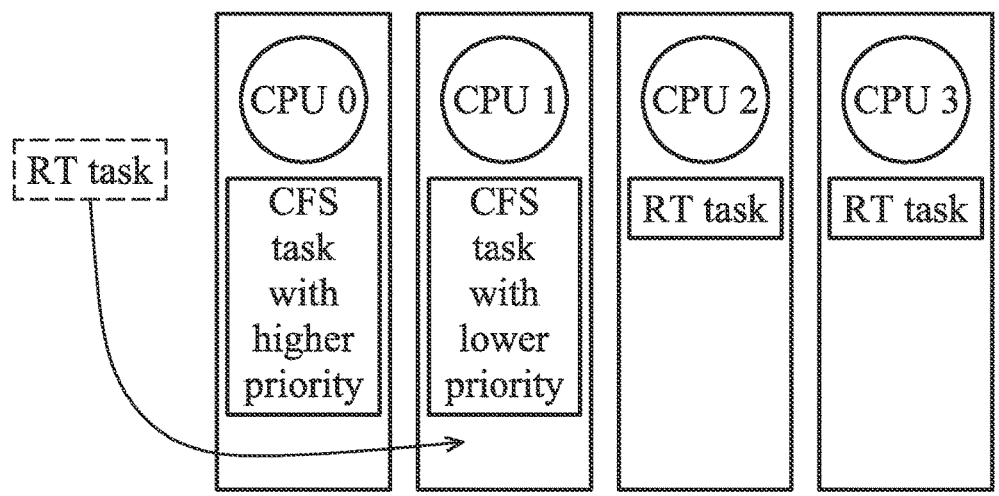
FIG. 5 is a schematic diagram for explaining task assignment in a third case according to further another embodiment of the invention.

FIG. 5 is a schematic diagram for explaining task assignment in a third case according to further another embodiment of the invention. As shown in FIG. 5, there are four processor cores (CPU 0-CPU 3) in the multi-core processor system 100. CPU 0 is assigned with a CFS task, CPU 1 is assigned with another CFS task, and CPU 2 and CPU 3 are assigned with respective RT tasks, wherein each of the RT tasks has higher priority than the CFS task, and the CFS task assigned to CPU 0 has higher priority than the CFS task assigned to CPU1.

When an RT task is awaken, by referring to the task assignment information corresponding to the CFS tasks and RT tasks (i.e. the first task assignment information and the second task assignment information), the task scheduler 110 can assign the RT task to CPU 1 because the CFS task assigned to CPU 1 has the lowest priority of the four tasks assigned to the four processor cores CPU 0-CPU 3.

In comparison, a conventional task scheduler in the third case only refers to the first task assignment information, that is, the task assignment about the RT tasks, it may not be able to discriminate CPU 0 and CPU 1 and may therefore assign the RT task to any of CPU 0 and CPU 1. That is, the conventional task scheduler might undesirably, assign the RT task to CPU 0 rather than CPU1. In contrast, the task scheduler 110 in the can obtain the second task assignment information about the CFS tasks, and therefore the task scheduler 110 can assign the RT task to CPU 1 with a lower task priority.

Figure 6:
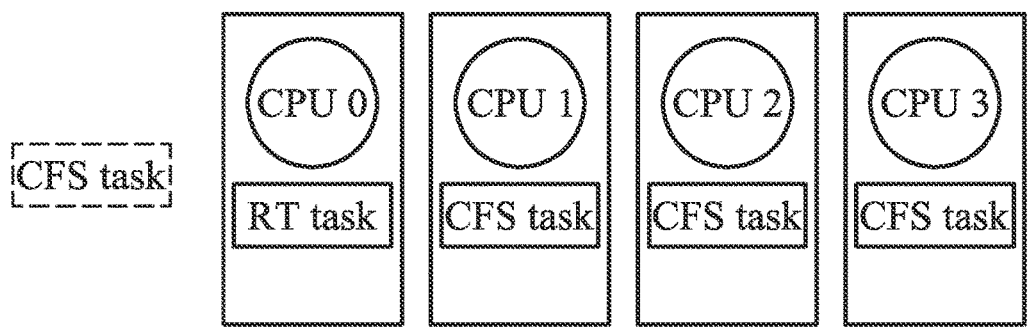
FIG. 6 is a schematic diagram for explaining task assignment in a fourth case according to still further another embodiment of the invention.

FIG. 6 is a schematic diagram for explaining task assignment in a fourth case according to still further another embodiment of the invention. As shown in FIG. 6, there are four processor cores (CPU 0-CPU 3) in the multi-core processor system 100, where CPU 0 is assigned with an RT task, and CPU 1-CPU 3 are assigned with respective CFS tasks. When a CFS task is awaked and to be assigned to one of CPU0-CPU3, the task scheduler 110 can refer to task assignment information about CFS tasks and task assignment information about RT tasks. Since the RT task has a higher priority than all of the CFS tasks, the task scheduler 110 may schedule the CFS task to be run on one of CPU 1-CPU3, according to a scheduling method of the CFS.

In comparison, a conventional task scheduler in this case only refers to the first task assignment information, i.e., information about CFS tasks, so it assigns the CFS task to CPU0 as a result of not considering that an RT task is assigned to CPU 0. This causes an undesired situation that the CFS task may not be executed until the RT task has been completed. In contrast, the task scheduler 110 in this embodiment can fully consider the CFS tasks and RT tasks and task priorities thereof, so it is able to appropriately assign the CFS task to CPU 1, CPU2, or CPU3 according to the CFS.

FIGS. 5 and 6 are similar in that when the runnable task in the first scheduling class (RT task in FIG. 5 and CFS task in FIG. 6) is wakened up and is to be assigned to one of the processor cores CPU 0-CPU 1, none of the processor cores is not assigned with any tasks in any scheduling classes. In other words, each processor core is assigned with at least one task. FIGS. 5 and 6 differ mainly in that in task priorities of tasks currently assigned to CPU0-CPU4 compared to that the task priority of the runnable task. More specifically, in FIG. 5, two or more of the processor cores, i.e. CPU 0 and CPU1 are assigned with tasks (CFS tasks) having task priorities each lower than the task priority of the runnable task (RT task). In contrast, at least one of the processor cores (CPU 0) is assigned with at least one task each having a respective task priority higher than the task priority of the runnable task (i.e., CPU 0 is assigned with at least one RT task), and the at least one processor core (CPU1-CPU3) is not assigned with any tasks in the first scheduling class (RT tasks).

Moreover, task priorities of the tasks in the scheduling class lower than (in FIG. 5) or equal to (in FIG. 6) the first scheduling class are taken into consideration in the assigning process. Specifically, in FIG. 5, the runnable task in the first scheduling class (the RT task) can be preferably assigned to one of the two or more processor cores (CPU0 or CPU1), and more preferably, the processor core taking the runnable task can be one of the tasks that has a lowest task priority (i.e., CPU1). On the other hand, in FIG. 6, the runnable task in the first scheduling class (CFS task) can be assigned to one of the processor cores (CUP1-CPU3) other than the at least one processor core (CPU0) according to a scheduling algorithm corresponding to the first scheduling class (CFS) which takes task priorities of the CFS tasks on CPU1-CPU3 into consideration.

No matter is cases 4 or 5, a plurality of candidate processor cores (i.e., CPU0 and CPU1 in FIG. 5; and CPU1-CPU3 in FIG. 6) can be selected from CPU0-CPU4, and an most appropriate processor core can be further determined among the one or more processor core according to the task priorities of the tasks on the candidate processor cores. In both the steps, the additional reference to task assignment information about tasks different from the runnable task to be assigned can mitigate the problem of load imbalance and therefore improve performance of the multi-core processor system.

Figure 7:
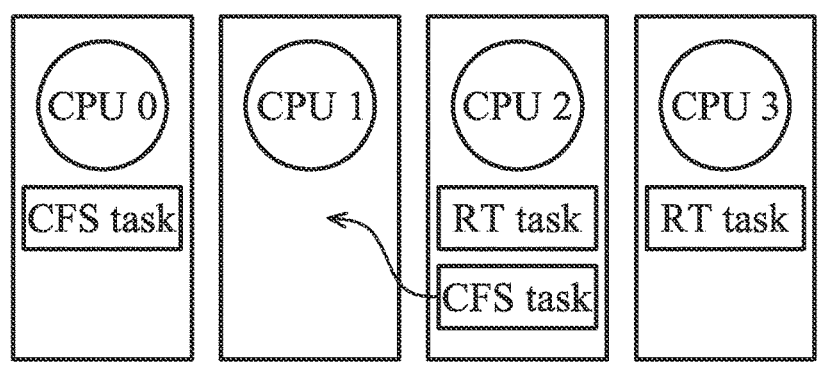
FIG. 7 is a schematic diagram for explaining task assignment in a fifth case according to yet further another embodiment of the invention.

In contrast to FIGS. 3-6 where the runnable task has not been assigned yet, the runnable task in FIG. 7 has been assigned to one of the processor cores prior to the assigning the runnable task. That is, the additional reference to task assignment information about tasks different from the runnable task can be also applied to determining whether to reassign the runnable task to another one of the processor cores.

FIG. 7 is a schematic diagram for explaining task assignment in a fifth case according to yet further another embodiment of the invention. As shown in FIG. 7, there are four processor cores (CPU 0-CPU 3) in the multi-core processor system 100. CPU 0 is assigned with a CFS task, CPU 1 is not assigned with any tasks, CPU 2 is assigned with an RT task and a CFS task, and CPU 3 is assigned with an RT task, wherein the RT task has a higher priority than the CFS task. When an idle balancing is to be performed for CFS tasks, since CPU2 is assigned with (i) at least one RT task, and (ii) at least one CFS task having a task priority lower than the at least one RT task, the task scheduler 110 can determine the CFS task can be reassigned to the processor core CPU1 that is not assigned with any tasks.

In comparison, since a conventional task scheduler refers to the task assignment information only about CFS tasks, it does not consider the RT task on CPU2 during a loading-balancing progress for CFS task, and therefore it might not considers it necessary to reassign the CFS task on CPU2 to any other processor core. In contrast, the task scheduler 110 refers to both the first task assignment information about the CFS tasks and the second task assignment information about the RT tasks, so it considers it necessary to reassign the CFS task on CPU2 to another processor core. Moreover, the task scheduler 110 is also able to discriminate the processor cores CPU1 and CPU3 and determine the more appropriate processor core CPU1 not assigned with any tasks to accept the reassigned CFS task.

In summary, the more complete consideration of task assignment information about tasks in more than one scheduling class can be applied to determining whether to reassign tasks if there is an idle processor core (i.e., without being assigned any tasks). More specifically, a specific scheduling class (i.e., the first scheduling class, which is class 1 in FIG. 7) can be determined to receive an idle balancing process. And if the first task assignment information and the second task assignment information indicate (1) one of the processor cores is not assigned with any tasks in any scheduling class (CPU1 in FIG. 7); and (2) at least one processor core of the processor cores (CPU2 in FIG. 7) is assigned with (i) at least one task in the first scheduling class to receive the idle balancing process (CFS tasks), and (ii) at least one task in a scheduling class different from the first scheduling class and the at least one task has lower task priority than the at least one task in the first scheduling class, then one of the at least one task in the first scheduling class (CFS task), which is then the runnable task, can be reassigned to the processor cores (CPU1 in FIG. 7) not assigned with any tasks.

Note that, the above embodiments shown with FIGS. 1-7 present cases with only the CFS tasks, RT tasks, and four processor cores (CPU 0-CPU 3). However, the invention should not be limited to what is shown in FIGS. 1-7. The discussions for the above embodiments can be readily analogized to other embodiments with different numbers and/or scheduling classes of tasks and other different numbers of processor cores.

Figure 8:
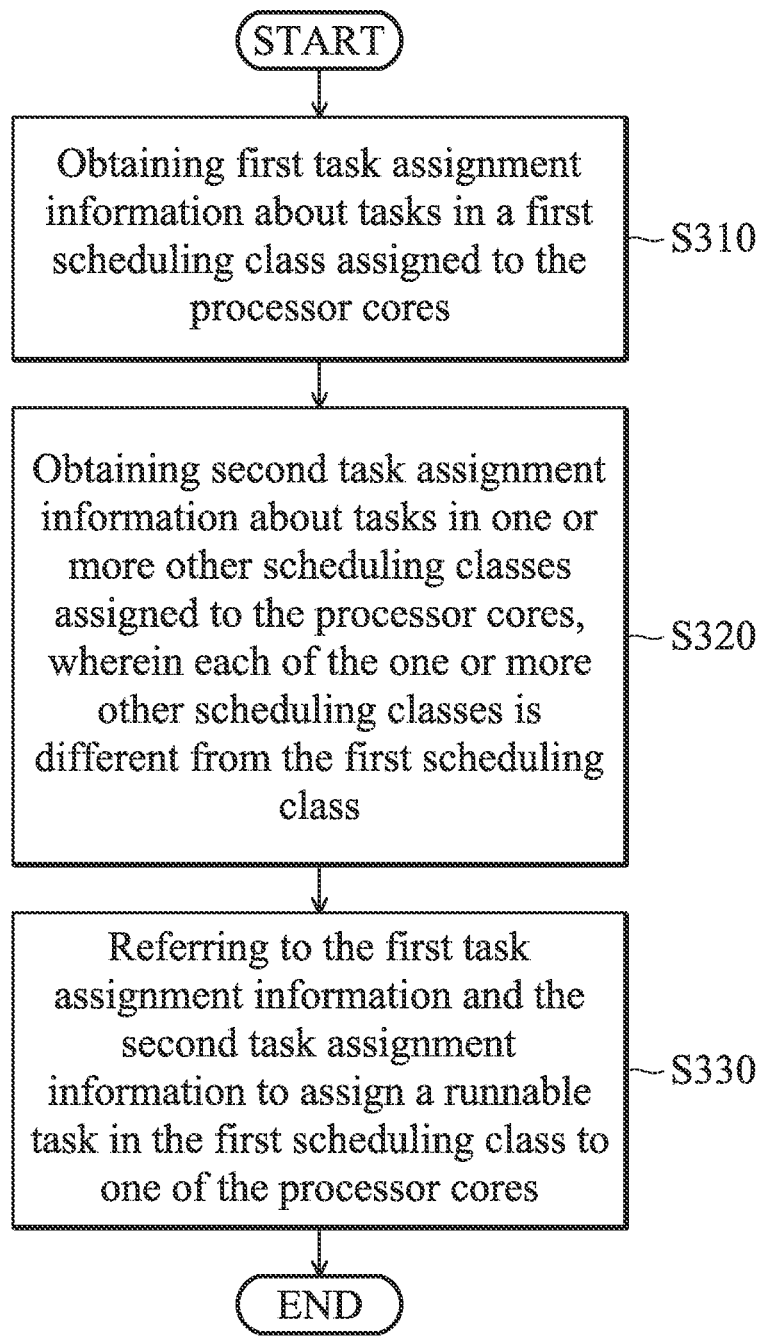
FIG. 8 is a flow chart illustrating a method for assigning tasks according to an embodiment of the invention.

FIG. 8 is a flow chart illustrating the method 300 for assigning tasks according to an embodiment of the invention. The method for assigning tasks may be applied to a multi-core processor system and by a task scheduler for scheduling tasks to a plurality of processor cores. It is noted that the shown sequence of the steps is not for limiting purpose, but for explanation purpose. In step S310, first task assignment information about tasks in a first scheduling class assigned to the processor cores can be obtained. In step S320, second task assignment information about tasks in one or more other scheduling classes assigned to the processor cores can be obtained. Each of the one or more other scheduling classes is different from the first scheduling class. In step S330, both the first task assignment information and the second task assignment information can be referred to assign a runnable task in the first scheduling class to one of the processor cores. More other details can be analogized from the discussions for embodiments illustrated with FIGS. 1-7 so are omitted here for brevity.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

In the conventional task scheduler, any task is assigned (newly assigned or reassigned) according to only task assignment information of tasks in the same scheduling class as the task to be assigned, and information of tasks of different scheduling class(es) are not considered. The conventional scheduling method considers different scheduling classes completely irrelevant to each other in assigning tasks. The incomplete reference to task assignment information causes many problems such as load imbalance and degraded system performance. In contrast, the embodiments consider fuller information, including not only task assignment information of tasks in the same scheduling class as the task to be assigned, but also information of tasks of scheduling class(es) different from the scheduling class of the task to be assigned. Therefore, the method in the embodiments can schedule a task according to a scheduling algorithm corresponding to the scheduling class of the task, and it can also assign the task to the processor cores according to information about a plurality of scheduling classes. Consequently, the embodiment can enhance load balance among processor cores and improve system performance.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method comprising:
operations to assign tasks in a multi-core processor system, wherein the multi-core processor system comprises the plurality of processor cores, and each of the tasks is in a respective one of a plurality of scheduling classes, the operations comprising:
obtaining first task assignment information about tasks which are in a first scheduling class from the plurality of scheduling classes and assigned to the plurality of processor cores, wherein the first task assignment information indicates current assignments of processor cores from the plurality of processor cores for the first scheduling class;
obtaining second task assignment information about tasks which are in one or more other scheduling classes and assigned to the plurality of processor cores, wherein each of the one or more other scheduling classes is different from the first scheduling class, wherein the second task assignment information indicates current assignments of processor cores from the plurality of processor cores for the one or more other scheduling classes;
referring to the first task assignment information and the second task assignment information to assign a runnable task in the first scheduling class to one of the plurality processor cores, wherein prior to the assigning of the runnable task, the runnable task has not been assigned to any of the plurality of processor cores; and
executing the runnable task;
prior to the assigning of the runnable task in the first scheduling class to the one of the processor cores:
waking up a task in the first scheduling class to be the runnable task;
choosing one of the plurality of processor cores to run the runnable task; and
indicating in the first task assignment information and the second task assignment information that at least one processor core of the plurality of processor cores is assigned with at least one task each having a respective task priority higher than a task priority of the runnable task in the first scheduling class, when the task in the first scheduling class is wakened up and is to be assigned to one of the plurality of processor cores.

2. The method of claim 1, wherein the plurality of scheduling classes correspond to a plurality of scheduling algorithms, respectively.

3. The method of claim 1, wherein the plurality of scheduling classes are associated with a plurality of priority ranges, respectively, and each of the tasks has a respective task priority in one of the priority ranges associated with the scheduling class of the task.

4. The method of claim 1, wherein in the referring to the first task assignment information and the second task assignment information to assign the runnable task in the first scheduling class, the first task assignment information indicates that at least one processor core is not assigned with any tasks in the first scheduling class, and the second task assignment information indicate the at least one of the other processor cores is assigned with at least one task in any scheduling class different from the first scheduling class.

5. The method of claim 1, wherein referring to the first task assignment information and the second task assignment information to assign the runnable task in the first scheduling class comprises:
judging whether any of the plurality of processor cores is not assigned with any tasks in the scheduling class according to whether the first task assignment information indicates that any of the plurality of processor cores is not assigned with any tasks in the first scheduling class and whether the second task assignment information indicates that any of the plurality of processor cores is not assigned with any tasks in any scheduling class different from the first scheduling class.

6. The method of claim 1, wherein when the runnable task in the first scheduling class is wakened up and is to be assigned to one of the processor cores, the first task assignment information and the second task assignment information indicate that at least one processor core is not assigned with any tasks in any scheduling class, and the second task assignment information further indicates that one or more of the other processor cores are assigned with one or more tasks in one or more different scheduling classes than the first scheduling class.

7. The method of claim 1, wherein when the runnable task in the first scheduling class is wakened up and is to be assigned to one of the processor cores, the first task assignment information and the second task assignment information indicate that none of the plurality of the processor cores is not assigned with any tasks in any scheduling classes, and that two or more of the plurality of the processor cores are assigned with tasks having task priorities each lower than a task priority of the runnable task.

8. The method of claim 1, wherein when the task in the first scheduling class is wakened up and is to be assigned to one of the plurality of the processor cores, the first task assignment information and the second task assignment information further indicate that the at least one of the plurality of processor cores is not assigned with any tasks in the first scheduling class, and none of the other of the plurality of processor cores is not assigned with any tasks.

9. The method of claim 8, wherein the runnable task in the first scheduling class is assigned to one of the processor cores other than the at least one processor core.

10. The method of claim 9, wherein the runnable task in the first scheduling class is assigned according to a scheduling algorithm corresponding to the first scheduling class.

11. A multi-core processor system, comprising:
a plurality of processor cores configured to perform a plurality of tasks, wherein each of the tasks is in a respective one of a plurality of scheduling classes; and
a task scheduler, configured to obtain first task assignment information about tasks which are in a first scheduling class from the plurality of scheduling classes and assigned to the plurality of processor cores, obtain second task assignment information about tasks which are in one or more other scheduling classes and assigned to the processor cores, wherein each of the one or more other scheduling classes is different from the first scheduling class, and refer to the first task assignment information and the second task assignment information to assign a runnable task in the first scheduling class to one of the plurality of processor cores, wherein the first task assignment information indicates current assignments of processor cores from the plurality of processor cores for the first scheduling class, and the second task assignment information indicate current assignments of the processor cores for the one or more other scheduling classes, wherein prior to the assigning of the runnable task, the runnable task has not been assigned to any of the processor cores, wherein prior to the assigning of the runnable task in the first scheduling class to the one of the processor cores, the task scheduler wakes up a task in the first scheduling class to be the runnable task, and chooses one of the plurality of processor cores to run the runnable task, wherein when the task in the first scheduling class is wakened up and is to be assigned to one of the plurality of processor cores, the first task assignment information and the second task assignment information indicate that at least one of the plurality of processor cores is assigned with at least one task each having a respective task priority higher than a task priority of the runnable task in the first scheduling class; and one or more processor cores from the plurality of processor cores perform the runnable task.

12. The multi-core processor system of claim 11, wherein the plurality of scheduling classes correspond to a plurality of scheduling algorithms, respectively.

13. The multi-core processor system of claim 11, wherein the plurality of scheduling classes are associated with a plurality of priority ranges, respectively, and each of the tasks has a respective task priority in one of the priority ranges associated with the scheduling class of the task.

14. The multi-core processor system of claim 11, wherein in the referring to the first task assignment information and the second task assignment information to assign the runnable task in the first scheduling class, the first task assignment information indicates that at least one of the plurality of processor cores is not assigned with any tasks in the first scheduling class, and the second task assignment information indicate the at least one of the other of the plurality of processor cores is assigned with at least one task in any scheduling class different from the first scheduling class.

15. The multi-core processor system of claim 11, wherein the task scheduler judges whether any of the plurality of processor cores is not assigned with any tasks in any scheduling class according to whether the first task assignment information indicates that any of the plurality of processor cores is not assigned with any tasks in the first scheduling class and whether the second task assignment information indicates that any of the plurality of processor cores is not assigned with any tasks in any scheduling class different from the first scheduling class.

16. The multi-core processor system of claim 11, wherein when the runnable task in the first scheduling class is wakened up and is to be assigned to one of the plurality of processor cores, the first task assignment information and the second task assignment information indicate that at least one of the plurality of processor cores is not assigned with any tasks in any scheduling class, and the second task assignment information further indicates that one or more of the other of the plurality of processor cores are assigned with one or more tasks in one or more different scheduling classes than the first scheduling class.

17. The multi-core processor system of claim 11, wherein when the runnable task in the first scheduling class is wakened up and is to be assigned to one of the plurality of processor cores, the first task assignment information and the second task assignment information indicate that none of the plurality of processor cores is not assigned with any tasks in any scheduling classes, and that two or more of the plurality of processor cores are assigned with tasks having task priorities each lower than a task priority of the runnable task.

18. The multi-core processor system of claim 11, wherein when the task in the first scheduling class is wakened up and is to be assigned to one of the plurality of processor cores, the first task assignment information and the second task assignment information further indicate that the at least one processor core is not assigned with any tasks in the first scheduling class, and none of the other of the plurality of processor cores is not assigned with any tasks.

19. The multi-core processor system of claim 18, wherein the runnable task in the first scheduling class is assigned to one of the plurality of processor cores other than the at least one of the plurality of processor cores.

20. The multi-core processor system of claim 19, wherein the runnable task in the first scheduling class is assigned according to a scheduling algorithm corresponding to the first scheduling class.

* * * * *